(12) United States Patent
Lin et al.

(10) Patent No.: US 9,280,482 B2
(45) Date of Patent: Mar. 8, 2016

(54) METHODS AND SYSTEMS FOR PROVISIONING A BOOTABLE IMAGE ON TO AN EXTERNAL DRIVE

(71) Applicant: Western Digital Technologies, Inc., Irvine, CA (US)

(72) Inventors: James Lin, San Jose, CA (US); Edwin Barnes, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 34 days.

(21) Appl. No.: 13/714,385

(22) Filed: Dec. 13, 2012

(65) Prior Publication Data

US 2014/0173215 A1    Jun. 19, 2014

(51) Int. Cl.
  *G06F 12/08*     (2006.01)
  *G06F 9/445*     (2006.01)
  *G06F 9/44*      (2006.01)

(52) U.S. Cl.
  CPC .............. *G06F 12/0891* (2013.01); *G06F 8/60* (2013.01); *G06F 9/4401* (2013.01); *G06F 12/08* (2013.01); *G06F 2211/1019* (2013.01); *G06F 2212/217* (2013.01)

(58) Field of Classification Search
  CPC .................................................. G06F 12/0815
  See application file for complete search history.

(56) References Cited

U.S. PATENT DOCUMENTS

| 5,325,532 | A  | 6/1994  | Crosswy et al. |
| 6,499,054 | B1 | 12/2002 | Hesselink et al. |
| 6,732,158 | B1 | 5/2004  | Hesselink et al. |
| 6,944,867 | B2 | 9/2005  | Cheston et al. |
| 7,120,692 | B2 | 10/2006 | Hesselink et al. |
| 7,447,842 | B2 * | 11/2008 | Depta ............................ 711/119 |
| 7,454,443 | B2 | 11/2008 | Ram et al. |
| 7,467,187 | B2 | 12/2008 | Hesselink et al. |
| 7,546,353 | B2 | 6/2009  | Hesselink et al. |
| 7,587,467 | B2 | 9/2009  | Hesselink et al. |
| 7,600,036 | B2 | 10/2009 | Hesselink et al. |
| 7,788,404 | B2 | 8/2010  | Hesselink et al. |
| 7,917,628 | B2 | 3/2011  | Hesselink et al. |
| 7,934,251 | B2 | 4/2011  | Hesselink et al. |
| 7,949,564 | B1 | 5/2011  | Hughes et al. |
| 8,004,791 | B2 | 8/2011  | Szeremeta et al. |
| 8,255,661 | B2 | 8/2012  | Karr et al. |
| 8,285,965 | B2 | 10/2012 | Karr et al. |
| 8,341,117 | B2 | 12/2012 | Ram et al. |
| 8,341,275 | B1 | 12/2012 | Hesselink et al. |
| 8,352,567 | B2 | 1/2013  | Hesselink et al. |

(Continued)

OTHER PUBLICATIONS

Window to Go, Wikipedia, Nov. 28 2012.*

(Continued)

*Primary Examiner* — Duc Doan

(57) ABSTRACT

The present invention relates to a method of optimizing the provisioning of a bootable image onto a storage device. In some embodiments, a host device executes a provisioning application to image a storage drive as a bootable drive. During the provisioning process, the storage device is configured to disguise its use of write caching during the provisioning process. In one embodiment, the storage device is configured to suppress forced unit access commands and cache flush commands for the provisioning application. In another embodiment, the storage device is configured to reject forced unit access commands. The storage device may disguise its use of write caching based on various criteria, such as a length of time, a counter, and the like.

16 Claims, 3 Drawing Sheets

(56) References Cited

U.S. PATENT DOCUMENTS

| | | |
|---|---|---|
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 8,713,265 B1 | 4/2014 | Rutledge |
| 8,762,682 B1 | 6/2014 | Stevens |
| 8,780,004 B1 | 7/2014 | Chin |
| 8,793,374 B2 | 7/2014 | Hesselink et al. |
| 8,819,443 B2 | 8/2014 | Lin |
| 2003/0182500 A1 | 9/2003 | Raves et al. |
| 2005/0144195 A1 | 6/2005 | Hesselink et al. |
| 2005/0144200 A1 | 6/2005 | Hesselink et al. |
| 2005/0149924 A1 | 7/2005 | Komarla et al. |
| 2006/0164139 A1* | 7/2006 | Chong et al. .................. 327/158 |
| 2006/0259754 A1 | 11/2006 | Miller et al. |
| 2007/0136523 A1* | 6/2007 | Bonella et al. ................ 711/113 |
| 2007/0283343 A1 | 12/2007 | Aridor et al. |
| 2009/0172286 A1* | 7/2009 | Lasser et al. .................. 711/127 |
| 2010/0042773 A1* | 2/2010 | Yeh ................................ 711/103 |
| 2012/0036041 A1 | 2/2012 | Hesselink |
| 2012/0303942 A1 | 11/2012 | Peacock |
| 2013/0212401 A1 | 8/2013 | Lin |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2014/0095439 A1 | 4/2014 | Ram |
| 2014/0173215 A1 | 6/2014 | Lin et al. |

OTHER PUBLICATIONS

International Search Report and Written Opinion dated Jan. 28, 2014 from PCT/US2013/062756 (Atty. Docket No. T6177.W0), filed Sep. 30, 2013, 12 pp.

* cited by examiner

METHODS AND SYSTEMS FOR PROVISIONING A BOOTABLE IMAGE ON TO AN EXTERNAL DRIVE

BACKGROUND

Today, many operating systems can be booted from a portable external storage device, such as a direct attached storage device. For example, the Microsoft Windows 8, supports "Windows To Go." Windows To Go allows a portable storage drive to be imaged with a full bootable operating system. This allows the portable storage drive to be plugged into virtually any computer and run its image.

In order to image a portable drive, it is connected to a host device, such as a personal computer or server and imaged with an imaging application or tool, such as ImageX. Unfortunately, the provisioning process has been found to take considerable time, e.g., several hours. For an enterprise seeking to image large numbers of drives, this amount of time is a significant disadvantage. Therefore, it would be desirable to optimize or reduce the amount of time needed to create bootable storage device.

BRIEF DESCRIPTION OF THE DRAWINGS

Systems and methods which embody the various features of the invention will now be described with reference to the following drawings, in which.

DETAILED DESCRIPTION

The embodiments relate to creating a portable or external bootable storage device. With the known imaging processes, the writing of the bootable image to the storage device employs a conservative write process that requires frequent acknowledgements and confirmation exchanges between the host and the storage device. In particular, many of the known provisioning processes employ forced unit access commands frequently to guarantee that the write data has been written to the media of the storage device. However, the frequent use of these commands slow the performance of the storage device because it prevents the use of write caching by the storage device.

Accordingly, in the embodiments, methods and systems are provided to reduce the amount of time needed to create a bootable image on a storage device. For example, one embodiment relates to provisioning a bootable image onto an external storage device, such as a direct attached storage device. Those skilled in the art will recognize that any type of bootable external drive may be created by the embodiments. In some embodiments, in order to help reduce the amount of time needed for the imaging process, the storage device is configured to disguise its use of write caching from the imaging application running on the host device. The storage device responds as if it is following the write commands and confirmation acknowledgements of the host during provisioning, but is transparently employing write caching. The disguise feature avoids error conditions and allows the imaging application to function normally. To minimize risks of this approach, the disguise feature may be configured with a limited duration, such as a finite number of cycles or short time period. The write caching allows the storage device to optimize its performance and drastically reduces the amount of time needed to provision the bootable image on to the drive.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

Figure 1:
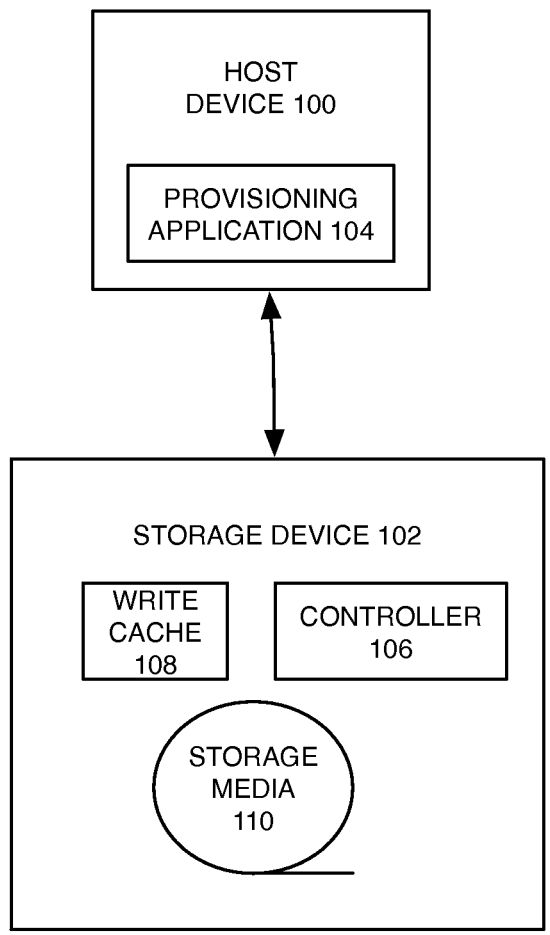
FIG. 1 is a block diagram illustrating a storage device that is coupled to a host device.

FIG. 1 is a block diagram illustrating a host device 100 that is coupled to a storage device 102. As will be explained further below, in some embodiments, the host device 100 images the storage device 102 as a bootable storage device, such as a Windows To Go Drive.

Host device 100 refers generally to any computer or system. For example, the host device 100 may be a personal computer, a laptop computer, a server, a tablet computer, a mobile device, etc. Host device 100 may comprise well-known hardware, firmware, and software. For example, host device 100 may comprise a processor (not shown) executing an operating system, such as the Windows™, Mac OS, Linux, UNIX, operating systems, and the like.

In addition, as shown in FIG. 1, the host device 100 may comprise a communications interface, such as a Universal Serial Bus (USB) interface, for communication with the storage device 102. As is well known, USB is an industry standard interface that defines cabling, connectors, and communications protocols for communications between a computer, such as host device 100 and a peripheral device, such as storage device 102.

As shown, a host device 100 may be coupled to a storage device 102 via one of its interfaces, such as a USB interface, a firewire interface, a Thunderbolt interface, etc.

As also shown, the host device 100 provides a hardware and software platform upon which a provisioning application 104 may execute. The provisioning application 104 is a tool or application that creates, edits, and deploys a bootable image, such as an image with a bootable operating system, to a target storage device or drive. In some embodiments, the provisioning application 104 uses the known ImageX tool provided by Microsoft™. In one embodiment, the host device 100 is running a provisioning application 104, for example, provided by the manufacturer of the storage device 102. The provisioning application 104 may be downloaded or copied onto the host device 100 from a network, such as the Internet, or the drive itself.

In some embodiments, the provisioning application 104 is configured to recognize the storage device 102 when it is coupled to the host device 100 and trigger disguising of its write caching for the provisioning process. In one embodiment, the provisioning application 104 is included as part of an application pre-installed on the storage device 102.

Storage device 102 refers to any data storage device that may be coupled to the host device 100. For example, the storage device 102 may be a hard disk drive, a flash drive, a solid-state drive, a hybrid drive, a network attached storage, etc. As noted, the storage device 102 may be a portable, external storage device that is intended to include a bootable image. The storage device 102 may connect to the host device 100 via a USB 2.0 or 3.0 connection and the like.

As will be further described below, in some embodiments, the storage device 102 is configured to disguise its use of write caching during provisioning of the bootable image by the provisioning application 104. In some embodiments, this disguise feature is implemented for a limited duration, such as a finite number of cycles, a period of time, etc. For example, in one embodiment, the storage device 102 is configured to limit its disguise features to 3 power cycles or connection cycles. Alternatively, in other embodiments, the storage device 102 is configured to limit its disguise features for a time period, such as 1 hour, 1 day, etc.

As shown, the storage device 102 may comprise various hardware and software that is known to those skilled in the art. For example, the storage device 102 may comprise, among other things, a controller 106, a write cache 108, and a storage media 110.

The controller 106 performs various operations of the storage device 102 described herein. The controller 106 may be implemented using one or more processors for executing instructions and may further include memory, such as a volatile or non-volatile memory, for storing data (e.g., data being processed) and/or instructions. The instructions may be executed by the one or more processors to perform the various functions of the controller 106 described herein. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

The write cache 108 is an embedded memory of the storage device to act as a buffer between the host device 100 and the storage media 110. When using write caching, the controller 106 signals the host device 100 that a write command is complete immediately after receiving the write data, even before the data are actually written to the storage media 110. This early signal allows the host device 100 and provisioning application 104 to continue working even though the data has not actually been written yet.

Of note, in conventional provisioning of a bootable image, the write process attempts to avoid or minimize the use of write caching, for example, through the use of Forced Unit Access commands or cache flush commands. This is done by conventional provisioning processes, because if power is lost before the data are permanently fixed in the media, the data will be lost from the write cache 108, and the file system and boot image may be left in an inconsistent state. Accordingly, the conventional policy is to turn caching off because the integrity of data is deemed more important than write performance. In addition, the conventional provisioning processes send data to disk in a carefully managed order and to issue cache flush commands at various times. Unfortunately, this results in a provisioning process that takes significant amounts of time, e.g., several hours or more.

In some embodiments, the controller 106 is configured to disguise its use of write caching during provisioning of a bootable image by managing the vulnerable period between signaling the write complete and actual performance of writing data to the storage media 110. For example, the controller 106 may control deferral of any write commands as newly arriving requests are received. In some embodiments, the storage device 102 may also comprise a battery-backed memory system for the write cache 108 or other protective features.

The storage media 110 represents the media in which data is stored. The storage media 110 may comprise, for example, any number of magnetic media, solid-state media, etc. For example, the storage media 110 may comprise a number of magnetic disks. Alternatively, the storage media 110 may comprise a solid-state drive. Of course, in yet other embodiments, the storage media 110 may comprise different forms of media alone or in combination.

Figure 2:
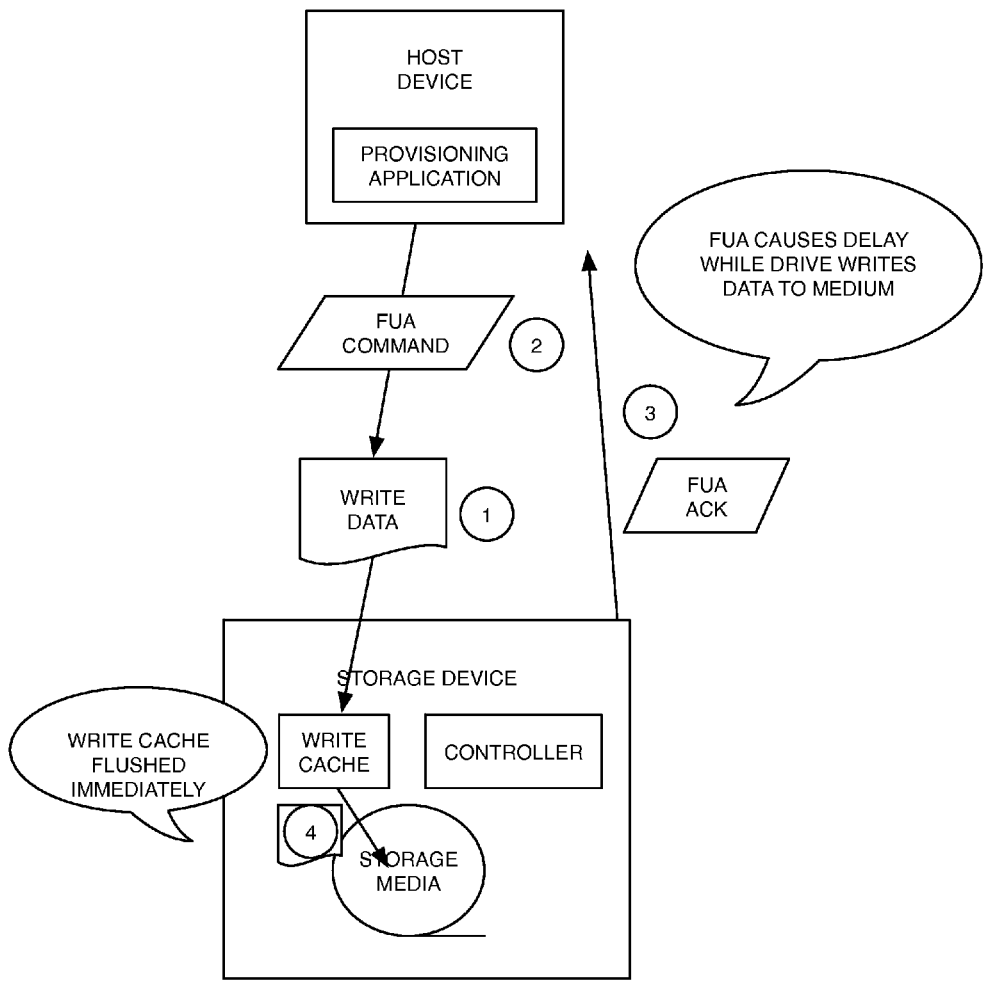
FIG. 2 illustrates a conventional process for imaging a portable storage device.

FIG. 2 illustrates a conventional imaging process that is known to those skilled in the art. In particular, first, a provisioning application may send write data for a bootable image to the storage device. Typically, the storage device will temporarily hold this write data in its write cache.

Second, as noted above, the provisioning application deems data integrity more important than performance, and thus, sends a cache flush or Forced Unit Access command to the storage device. This command is intended to limit or prevent the use of write caching by the storage device.

Third, the storage device acknowledges the command, which causes it delay writing data to its storage medium. Fourth, the storage device is commanded to write the data from the write cache in to the storage medium. This process is repeated until the bootable image has been written to the storage device. As can be seen, however, this conventional process is tightly controlled by the provisioning application and host and prevents the storage device from optimizing its performance. Accordingly, FIG. 3 is provided below to illustrate an embodiment of the present invention.

Figure 3:
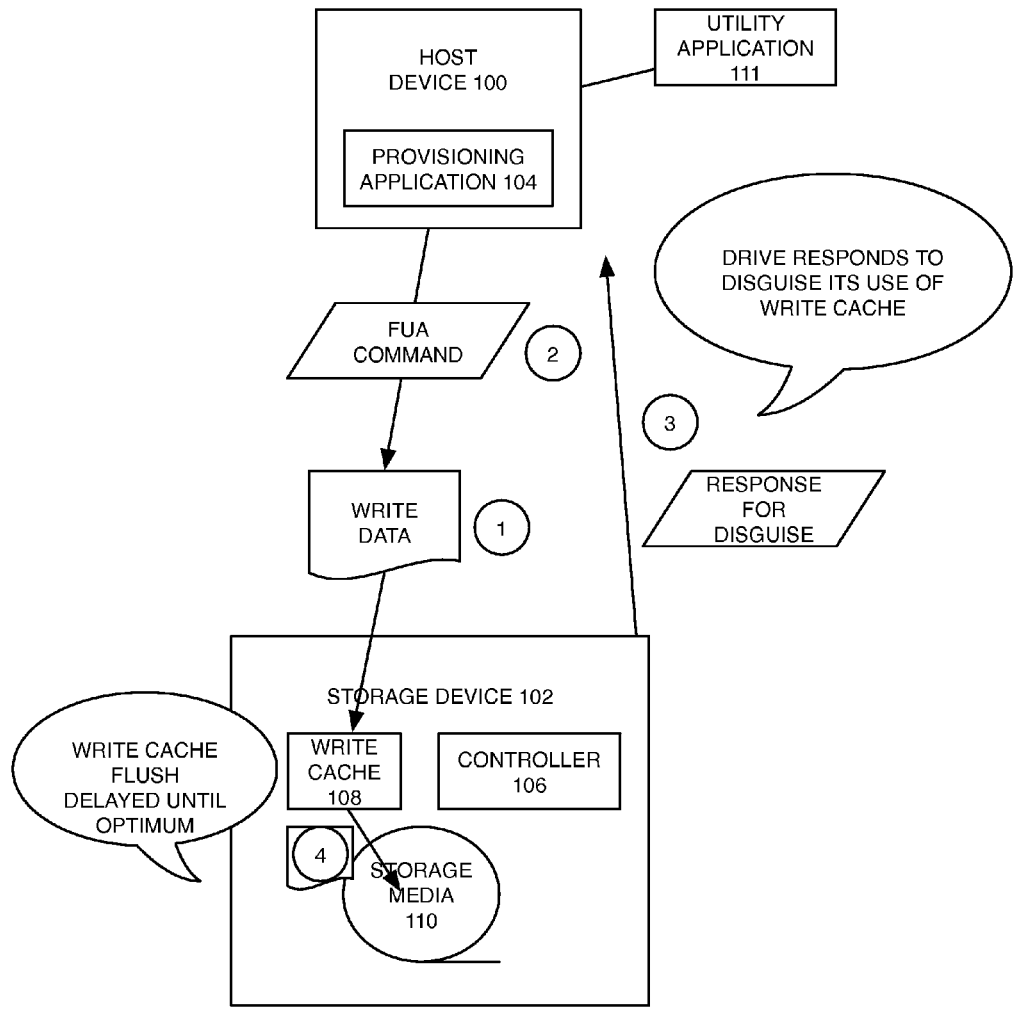
FIG. 3 illustrates an exemplary process flow for imaging a portable storage device in accordance with an embodiment of the present invention.

FIG. 3 illustrates an exemplary process flow in which the storage device 102 disguises its use of write caching and allows normal execution of the provisioning application 104. As shown, first, the host device 100 has installed a provisioning application 104. The provisioning application 104 may be retrieved from the storage device 102. Alternatively, the host device 100, for example may download the provisioning application 104, from the Internet.

In some embodiments, the host device 100 may run a utility application 111. In one embodiment, the utility application 111 provides a utility and user interface for a user at host device 100 to request and configure the storage device 102 as a bootable external drive. In some embodiments, the utility application 111 sends one or more commands to the storage device 102 to commence disguise of its write caching, which is described further below.

In some embodiments, the utility application 111 works in cooperation with the provisioning application 104 to provision and image a bootable image onto the storage device 102. For example, a user of host device 100 may first start the utility application 111 to determine the configuration and available features of the storage device 102. The user may then run the provisioning application 104 to request imaging of a bootable image on to the storage device. As noted, the provisioning application 104 may then employ a tool or utility, such as ImageX, provided by the operating system of the host device 100 to image the storage device 102.

For example, when started or running, the utility application 111 may be configured to recognize the storage device 102 and whether it is capable of expediting the imaging process, for example, by disguising write caching. In some embodiments, the utility application 111 may determine the device identifier of the storage device 102 to determine the manufacturer, model, device drivers, etc. This information may be retrieved, for example, from the registry maintained by the operating system running on the host device 100. If the utility application 111 determines that the storage device 102 does not support expedited imaging, then it will image the bootable image conventionally. If the storage device 102 can support expedited imaging, then the utility application 111 may send an indicator, command, or flag to the storage device 102.

In response, the storage device 102 may initiate its disguise feature, which is described further below. In some embodiments, the storage device 102 implements the disguise feature for a limited duration. For example, the storage device 102 may only use its disguise feature for a finite number of power cycles, i.e., when the storage device 102 is connected/disconnected from the host device 100, or turned off/on, etc. In other embodiments, the storage device 102 will limit the disguise feature for a limited time, such as 30 minutes, 1 hour, etc.

After checking the storage device 102, the utility application 111 may then have the provisioning application 104 commence imaging of the storage device 102. The write data for the bootable image may be sent in various forms known to those skilled in the art.

Second, as shown during this writing process, the operating system (not shown) of the host device 100, at various times, sends a Forced Unit Access command, cache flush command, etc. to the storage device 102. These operations are requested by the operating system in order to protect the data integrity of the bootable image. For example, the operating system may send a Forced Unit Access Command after each file has been sent to the storage device. In addition, the operating system of the host device 100 may send one or more synchronized cache commands to the storage device 100. As noted, the operating system of the host device 100 sends these commands protect the data integrity of the bootable image. However, such protective features can dramatically slow down the write performance of the storage device 102. For example, in the prior art, imaging of a bootable image and associated data can take up to several hours.

In the embodiments, however, the storage device 102 provides an alternative to the inefficient data integrity used in the prior art. In particular, third, the storage device 102 acknowledges the command from the host device 100 to indicate that the write cache 108 will be flushed and confirm when the write data has been fixed to the storage media 110. In some embodiments, however, this acknowledgement or response is a disguise of the write cache because, contrary to the acknowledgement, the storage device 102 continues caching the write data in the write cache 108. The acknowledgment provides a positive response back to the host device 100 and the operating system. Thus, host device 100 is effectively led to believe that the storage device 102 has performed the requested data integrity commands, e.g., a Forced Unit Access command or cache flush command. The storage device 102, however, may continue to use write caching and optimize the write performance of the bootable image.

Fourth, the storage device 102 employs the use of write caching to optimize its write performance. Such write acceleration is known to those skilled in the art. The process repeats or continues until the bootable image has been written to the storage device 102 and storage media 110.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. For example, the present disclosure is described with reference to a storage device, such as a hard disk drive, coupled to a host device via a USB interface. The invention may also be implemented in other types of devices, such as a peripheral device, a flash drive, a solid-state drive, a hybrid drive, a network attached storage that communicate via USB. In addition, the invention may be implemented for other communications protocols. Accordingly, the scope of the present disclosure is intended to be defined only by reference to the appended claims.

What is claimed is:

1. A method of provisioning a bootable image onto a portable storage device, wherein the portable storage device comprises a volatile write cache, said method comprising:
   initiating write cache disguising in a portable storage device;
   receiving, from a host, a write command including write data for a bootable image;
   writing the write data to a volatile write cache of a portable storage device;
   provide a signal to the host indicating completion of the write command;
   receiving, from the host, a cache flush command;
   in response to receiving the cache flush command, disguising write caching of the write data in the volatile write cache at least in part by providing a response to the host that falsely indicates that the write data has been flushed from the volatile write cache without writing the write data to non-volatile memory of the portable storage device in response to the cache flush command;
   discontinuing write cache disguising in the portable storage device after a predetermined period; and
   after said discontinuing, flushing the write data from the volatile write cache.

2. The method of claim 1, wherein the cache flush command is a forced unit access command.

3. The method of claim 1, further comprising detecting connection of the portable storage device to the host and providing a command to the portable storage device to commence write cache disguising in response to said detecting.

4. The method of claim 3, further comprising, after said detecting the connection of the portable storage device to the host, determining whether the portable storage device is capable of expediting an imaging process.

5. The method of claim 4, wherein said determining comprises determining a device identifier associated with the portable storage device.

6. The method of claim 1, wherein the predetermined period has lapsed when a predetermined number of power cycles have occurred since the initiation of the write cache disguising.

7. The method of claim 6, further comprising determining when the predetermined number of power cycles have occurred at least in part by:
   setting a counter to an initial value;
   incrementing the counter in response to a startup cycle of the portable storage device; and
   determining that the predetermined number of power cycles have occurred when the counter reaches a threshold value.

8. The method of claim 1, wherein the predetermined period is a predetermined period of time.

9. A portable storage device comprising:
   a volatile write cache for temporarily storing data received from a host device;
   an interface configured for communications with the host device; and
   a controller configured to:
   receive, from the host device, a write command including write data for a bootable image;
   cache the write data in the volatile write cache;
   provide a signal to the host device indicating completion of the write command;
   receive a cache flush command from the host device;
   in response to the cache flush command, disguise write caching during provisioning of the boot image onto the portable storage device by providing a response to the host device that falsely indicates that the write data has been flushed from the volatile write cache without writing the write data to non-volatile memory of the portable storage device in response to the cache flush command;

discontinue write cache disguising in the portable storage device after a predetermined period; and after said discontinuing, flush the write data from the volatile write cache after a predetermined period.

10. The portable storage device of claim 9, wherein the cache flush command is a forced unit access command.

11. The portable storage device of claim 9, wherein the controller is further configured to receive a command from the host device to commence write cache disguising in response to connection of the portable storage device to the host device.

12. The portable storage device of claim 11, wherein the controller is further configured to provide information to the host device indicating that the portable storage device is capable of expediting an imaging process.

13. The portable storage device of claim 12, wherein the information comprises a device identifier associated with the portable storage device.

14. The portable storage device of claim 9, wherein the predetermined period has lapsed when a predetermined number of power cycles have occurred since write cache disguising was initiated.

15. The portable storage device of claim 14, wherein the controller is further configured to determine when the predetermined number of power cycles have occurred at least in part by setting a counter to an initial value, increment the counter in response to a startup cycle of the portable storage device, and determining that the predetermined number of power cycles have occurred when the counter reaches a threshold value.

16. The portable storage device of claim 9, wherein the predetermined period is a predetermined period of time.

* * * * *